(12) United States Patent
Deng et al.

(10) Patent No.: US 9,689,508 B2
(45) Date of Patent: Jun. 27, 2017

(54) MICROVALVE DEVICE AND FLUID FLOW CONTROL METHOD

(75) Inventors: Ning Deng, Beijing (CN); Zheyao Wang, Beijing (CN); Peiyi Chen, Beijing (CN); Shengchang Zhang, Zhejiang (CN); Tinghou Jiang, Zhejiang (CN)

(73) Assignees: ZHEJIANG DUNAN ARTIFICIAL ENVIRONMENT CO., LTD., Zhejiang (CN); TSINGHUA UNIVERSITY, Beijing (CN)

( * ) Notice: Subject to any disclaimer, the term of this patent is extended or adjusted under 35 U.S.C. 154(b) by 35 days.

(21) Appl. No.: 14/415,383

(22) PCT Filed: Aug. 9, 2012

(86) PCT No.: PCT/CN2012/079881
§ 371 (c)(1),
(2), (4) Date: May 22, 2015

(87) PCT Pub. No.: WO2014/023002
PCT Pub. Date: Feb. 13, 2014

(65) Prior Publication Data
US 2015/0252914 A1    Sep. 10, 2015

(51) Int. Cl.
*F16K 99/00* (2006.01)

(52) U.S. Cl.
CPC ...... *F16K 99/0034* (2013.01); *F16K 99/0042* (2013.01); *F16K 2099/009* (2013.01)

(58) Field of Classification Search
CPC ............. F16K 99/0034; F16K 99/0042; F16K 2099/009

(Continued)

(56) References Cited

U.S. PATENT DOCUMENTS

| 4,895,500 A | 1/1990 | Hok et al. |
| 5,065,978 A | 11/1991 | Albarda et al. |
| (Continued) | | |

FOREIGN PATENT DOCUMENTS

| CN | 101002029 A | 7/2007 |
| CN | 101446356 A | 6/2009 |
| JP | 7158757 | 6/1995 |

OTHER PUBLICATIONS

Chinese Office Action mailed Feb. 5, 2016.
Chinese Office Action mailed Sep. 8, 2016.

*Primary Examiner* — John K Fristoe, Jr.
*Assistant Examiner* — Ian Paquette
(74) *Attorney, Agent, or Firm* — Dilworth & Barrese, LLP; Michael J. Musella

(57) ABSTRACT

A microvalve device and fluid flow control method, the microvalve device comprising: a microvalve body, the microvalve body being composed of multiple layers and comprising a first layer (1) and a second layer (2) bonded with the first layer (1), the second layer (2) having a plurality of fluid ports (7, 8, 9); a cavity (6) disposed between the first layer and the second layer; a plurality of actuators (3, 4, 5) respectively disposed corresponding to each fluid port, the plurality of actuators (3, 4, 5) controlling the opening and closing of the plurality of fluid ports (7, 8, 9). The fluid flow control method comprising: respectively employing a plurality of actuators to independently control the opening and closing of a plurality of fluid ports.

14 Claims, 3 Drawing Sheets

(58) Field of Classification Search
USPC .................................................. 251/129.06
See application file for complete search history.

(56) References Cited

U.S. PATENT DOCUMENTS

| | | |
|---|---|---|
| 5,142,781 A | 9/1992 | Mettner et al. |
| 5,238,223 A | 8/1993 | Mettner et al. |
| 5,441,597 A * | 8/1995 | Bonne ................. F15B 13/0405 |
| | | 216/17 |
| 5,785,295 A | 7/1998 | Tsai |
| 6,131,879 A | 10/2000 | Kluge et al. |
| 7,195,670 B2 * | 3/2007 | Hansen ............. B01L 3/502738 |
| | | 117/201 |
| 2006/0162443 A1 * | 7/2006 | Drummond ........... A61M 16/20 |
| | | 73/276 |
| 2007/0051415 A1 * | 3/2007 | Wang ................. F16K 99/0001 |
| | | 137/861 |
| 2010/0012195 A1 * | 1/2010 | Hunnicutt ........... F16K 99/0001 |
| | | 137/1 |

* cited by examiner

MICROVALVE DEVICE AND FLUID FLOW CONTROL METHOD

TECHNICAL FIELD

Embodiments of the present invention relate to a microvalve device for controlling the fluid flow and a method of controlling the fluid flow with the microvalve device.

BACKGROUND

Pilot valves are usable for control of a flow of fluid so as to control main valves, and for control of the opening degree of the main valves. A microvalve is a typical one of the pilot valves usable for control of the main valves. By control of a pilot microvalve, a corresponding flux of controlled fluid is obtained, and with the controlled fluid, a precise control of the opening degree of a main valve can be achieved.

In general, a microvalve refers to a micro-electromechanical system (MEMS) machined by using microelectronics processes. In the microvalve machined by using microelectronics processes, the size of a core member (an actuator) is usually on the order of micrometer. Mechanical movement of the actuator is achieved by means of applying an electrical excitation to the actuator. In addition to this, the microvalve may further include other component that is produced by or not by micro-machined processes.

At present, there have been a variety of microvalve structures useful for control of the fluid flow in fluid passages in microvalves.

FIGS. 1 and 2 schematically illustrate an existing microvalve device. The microvalve device is composed of an actuator (not shown) and a movable member 20. The movement of the movable member 20 is controlled by the actuator, and a controllable movement of the actuator can be realized by means of applying an electrical signal to it. The movable member 20 has a plurality of through holes therein. Through movement of the movable member, the degree to which fluid ports 31 and 33 in the microvalve are opened can be controlled, so as to control the fluid flux outflowing from the microvalve (the flow of fluid in a chamber of the microvalve), and in turn, a main valve is controlled.

A typical actuator is constituted by a beam, one end of which is fixed, and a movable member is connected to the other end of the beam. Adequate displacement and driving force are generated by the actuator when it is driven by an electric signal, for driving the movable member to slide in a chamber, so that the flow status of fluid at a control port is changed. Thus, a purpose of controlling the main valve is achieved. For example, FIG. 1 and FIG. 2 illustrate different states in which the movable member 20 takes control of the fluid flow at different locations, respectively. Arrows in the figures denote the flow direction of fluid.

Size of the actuator and power of an input electric signal are jointly determined by the displacement that the movable member needs to move, amplifying function of the microvalve on the displacement and the required driving force.

SUMMARY

The pilot microvalve described in the section "Description of the Related Art" suffers from the following problems. One of the problems is that, displacement of an electric actuator cannot be determined uniquely by a determined control electric signal, and this leads to imprecise control of the fluid flux, so that an open-loop control of a pilot microvalve cannot be realized. Another problem is that, a sliding mechanism for control of three ports moves wholly under drive of the electric actuator, which makes on/off states of the three ports are relevant, leading to the fact that there is not a linear relationship between an electric signal for control of the pilot microvalve and the opening degree of the main valve, and thus, the main valve control becomes complex.

Against the above technical problems, according to an embodiment of the invention, there is provided a microvalve device for controlling fluid flow, comprising: a microvalve body, the microvalve body being composed of multiple layers and including a first layer and a second layer that is bonded with the first layer and has a plurality of fluid ports; a cavity, disposed between the first layer and the second layer; a plurality of actuators, respectively disposed corresponding to each fluid port, wherein, opening and closing of the plurality of fluid ports are controlled by the plurality of actuators independently.

In the above embodiment, the plurality of fluid ports are disposed in a region corresponding to the cavity, and the plurality of fluid ports run through the second layer.

In any of the above embodiments, each fluid port of the plurality of fluid ports is fully covered by one actuator, and upon the fluid port being in a closed state, the actuator closely contacts with a surface of the second layer surrounding the port, so as to block up the fluid flow through the fluid port.

In any of the above embodiments, corresponding one or two ends of each of the actuators are fixed around corresponding ports.

In any of the above embodiments, the actuators are configured to be deformed in response to application of opening signals, so that gaps for passing of fluid are formed between the actuators and a surface of the second layer surrounding corresponding ports, for opening of corresponding ports.

In any of the above embodiments, the first layer is configured for leadout of electrodes connected to the actuators, so that signals are input to the actuators.

In any of the above embodiments, the actuators are configured to be deformed in different degrees in response to size of the applied signals, so that gaps with different sizes are produced between lower surfaces of the actuators and a surface of the second layer surrounding the ports.

In any of the above embodiments, the actuators comprise electro-thermal actuators and piezoelectric actuators.

In any of the above embodiments, the actuators are metal-piezoelectric bilayer membrane actuators.

In any of the above embodiments, the plurality of actuators and the second layer containing the plurality of fluid ports can be formed at one time by micromechanical machining processes.

In any of the above embodiments, the microvalve device comprises a fluid source port, a control port and a backflow port, the fluid source port is communicated with a fluid source, and the control port is communicated with a mechanism for control of a main valve. In the embodiment, upon the fluid source port and the control port being open and the backflow port being closed, fluid flows from the fluid source port toward the control port; and upon the fluid source port being closed and the control port and the backflow port being open, fluid flows from the control port toward the backflow port.

According to another embodiment of the invention, there is provided a method of controlling fluid flow with a microvalve device, which comprises a microvalve body composed of multiple layers and including a first layer and a second layer that is bonded with the first layer and has a plurality of fluid ports, with a cavity formed between the first layer and the second layer, the method comprising: respectively adopting a plurality of actuators to independently control opening and closing of the plurality of fluid ports, so as to realize different combining manners of on/off states of fluid ports in correspondence with different modes in which fluid flows between ports.

In the method according to the above embodiment, in each of the combining manners of on/off states of fluid ports, the opening degree of each port is controllable independently.

Regarding the method according to any of the above embodiments, corresponding ports are controlled by means of applying electric signals to the actuators.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but are not limitative of the invention.

DETAILED DESCRIPTION

In order to make the technical objects, technical details and advantages of embodiments of the invention more clearly, hereinafter, technical solutions of the embodiments of the invention will be described in a way that is clear and complete in combination with accompanied drawings of the embodiments of the invention. It is obvious that the described embodiments of the invention are just a part but not all of the embodiments of the invention. Based on the described embodiments of the invention, those ordinarily skilled in the art can obtain other embodiment(s), without any inventive work, which come(s) into the scope sought for protection by the invention.

In view of the above issues in prior art, a method and a microvalve device for controlling the fluid flow are provided by embodiments of the invention.

In the method according to embodiments of the invention, ports of a fluid passage in a microvalve device are controlled independently, so as to attain a fluid under the control of an electric signal and being useful for control of a main valve. By virtue of independent control of each port, an open-loop control of the opening degree of the main valve can be realized by the method. Furthermore, by means of controlling the degree to which each port is open, a linear control of the opening degree of the main valve can be realized.

Based on the above method of controlling the fluid flow, a microvalve device is also suggested in the invention. For example, the microvalve device may be a pilot valve for control of a main valve. A microvalve body of the microvalve device includes a first layer for leadout of electrodes and a second layer containing a plurality of fluid ports. The first layer and the second layer are bonded with each other, so as to form a cavity for fluid flow between them. These ports run through the second layer and are disposed in a region corresponding to the cavity. That is, when a control port is in an open state, the port is fluid-communicated with the cavity. The opening and closing of each fluid port are controlled by a discrete actuator.

For example, the second layer may include three ports: a port for communication of a fluid source (a first port), a port for output of a fluid for control of a main valve (a second port) and a port for control of the fluid backflow (a third port). By virtue of operations of three discrete actuators, different flow modes of fluid between the three ports can be realized, thereby serving a function of controlling the main valve communicated with the microvalve device.

In addition, the "microvalve" in the application means that at least the size of actuators as core members is on the order of micrometer. The actuators may be, for example, manufactured by micro-machining processes.

The technical solutions of the invention will be further described below in combination with specific embodiments of the invention.

First Embodiment

Figure 1:
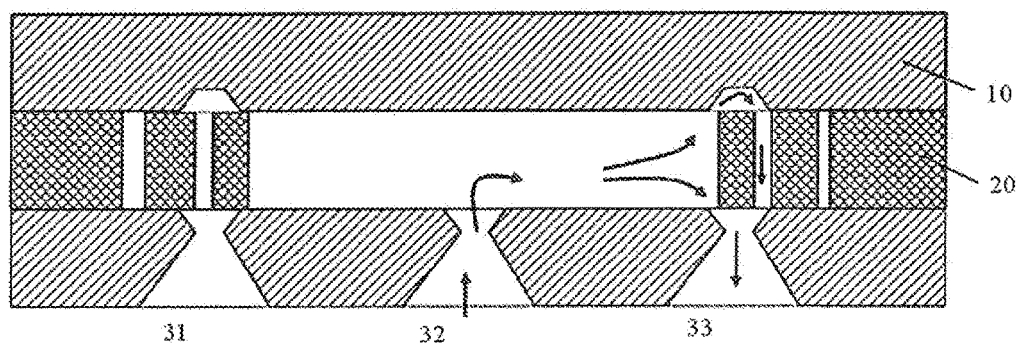
FIG. 1 is a schematic view illustrating a conventional microvalve in a first control state.
Figure 2:
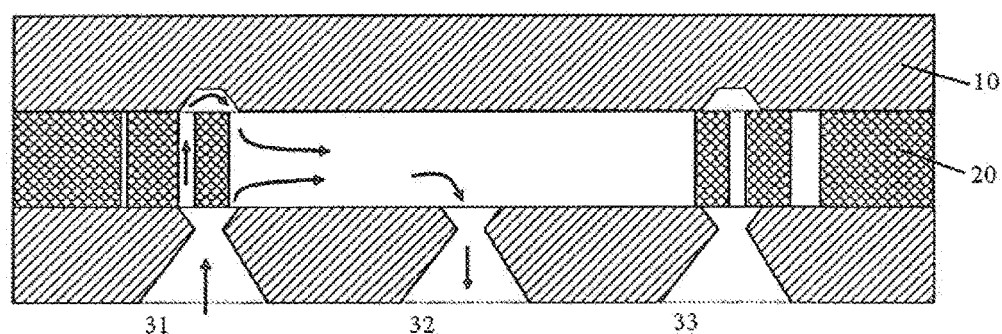
FIG. 2 is a schematic view illustrating the conventional microvalve in a second control state.
Figure 3:
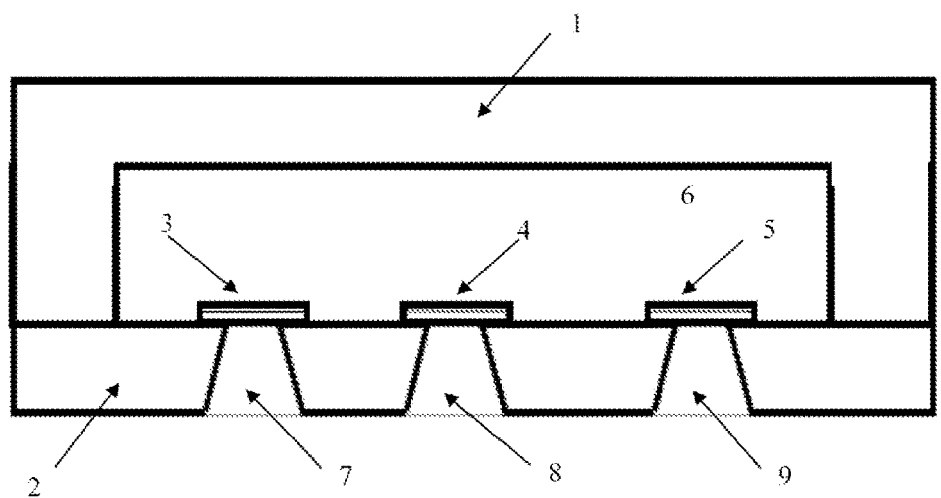
FIG. 3 is a schematic view illustrating the construction of a microvalve device according to a first embodiment of the invention.
Figure 4:
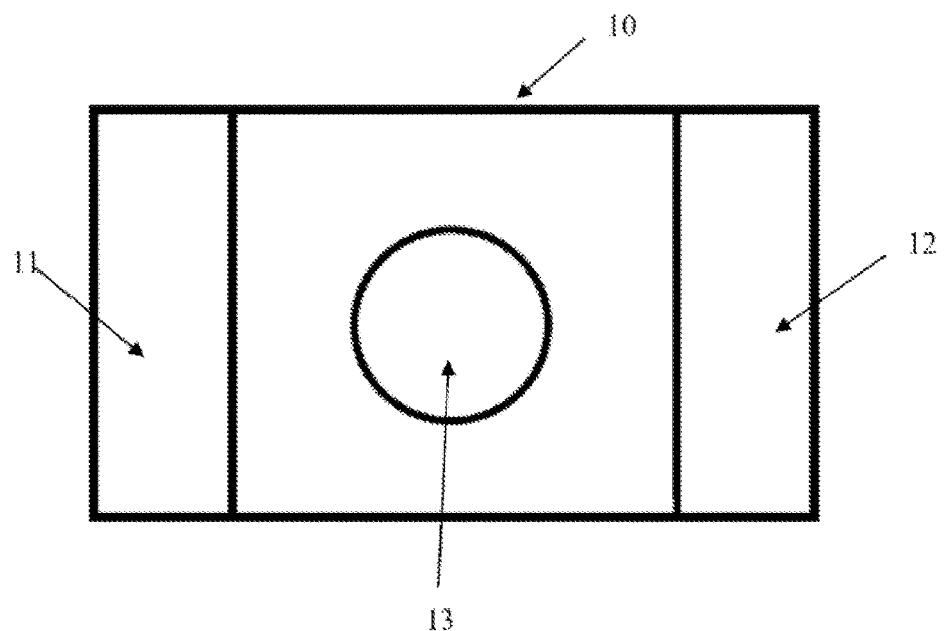
FIG. 4 is a top view illustrating a certain fluid port in the microvalve illustrated in FIG. 3 (containing an actuator at the port)
Figure 5:
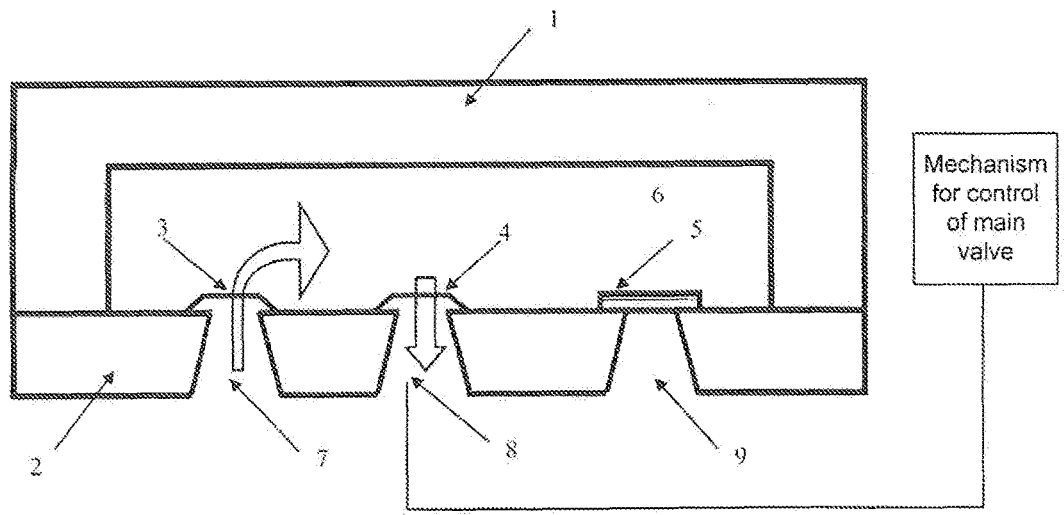
FIG. 5 is a schematic view illustrating a microvalve device in a first state (in a pressurized mode)
Figure 6:
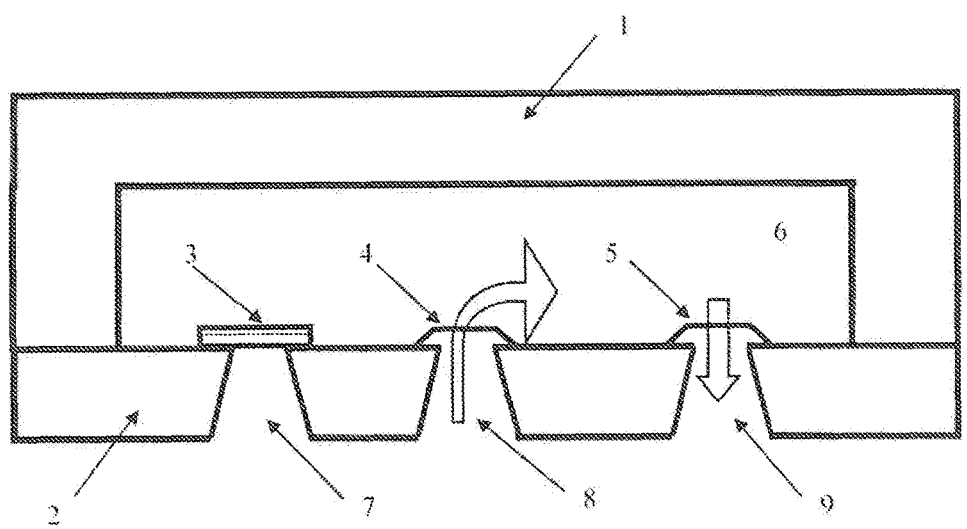
FIG. 6 is a schematic view illustrating a microvalve device in a second state (in a backflow mode).

FIG. 3 is a schematic view illustrating the construction of a microvalve device according to first embodiment of the invention. FIG. 4 is a top view illustrating a certain fluid port in the microvalve illustrated in FIG. 3. FIG. 5 is a schematic view illustrating the microvalve device in a first state (a pressurized mode). FIG. 6 is a schematic view illustrating the microvalve device in a second state (a backflow mode). The microvalve device may be a pilot microvalve for control of opening degree of a main valve.

As illustrated in FIG. 3, the microvalve device includes a first layer 1 for leadout of electrodes and a second layer 2 containing fluid ports. The first layer 1 may have a concave structure. The first layer 1 and the second layer 2 are bonded with each other and a side of the first layer 1 with the concave structure faces the second layer 2, so that a cavity 6 is formed between the first layer 1 and the second layer 2. The first layer 1 and the second layer 2 may be made of silicon, but material for the first layer 1 and the second layer 2 is not limited to silicon. The first layer 1 and the second layer 2 are preferably made of the same material, but they may also be made of different materials.

In the second layer 2, there are formed three fluid ports 7, 8, 9. The fluid ports 7, 8, 9 run through the second layer 2, and form passages through which the cavity 6 is communicated with the outside. For example, a fluid may flow into the cavity 6 or be discharged from the cavity 6 through a port. The opening and closing of the fluid ports 7, 8 and 9 are independently controlled respectively by actuators 3, 4, 5. Each of the fluid ports 7, 8, 9 is disposed in a region corresponding to the cavity 6, so that any one of the fluid ports 7, 8, 9 can be fluid-communicated with the cavity 6 when it is opened. In the embodiment, the fluid port 7 acts as a fluid source port, the fluid port 8 acts as a control port, and the fluid port 9 acts as a backflow port. For example, the fluid port 7 may be communicated with a fluid source, and the fluid port 8 may be communicated with a mechanism for control of the main valve.

In the embodiment, electrodes (not shown) to be led out by the first layer may be connected to the actuators 3, 4, 5, so as to apply driving signals to the actuators 3, 4, 5.

In the embodiment, the actuators 3, 4, 5 are membrane-type actuators, respectively, such as, metal-piezoelectric bilayer membrane actuators. However, it should be noticed that, the actuators 3, 4, 5 may be actuators of any other kind capable of controlling fluid ports, such as, actuators having an electro-thermal driven bilayer membrane structure. The actuator 3, 4, 5 cover the fluid ports 7, 8, 9 in such a manner that corresponding two ends of them (e.g. two opposite ends) are fixed onto a surface of the second layer 2 around the ports. As illustrated in FIG. 4, two fixed ends are denoted by "11" and "12". "13" in FIG. 4 denotes a top view of one fluid port in FIG. 3 or 5, and "10" denotes a side of an actuator that is not fixed. As can be seen from the top view, it is necessary for the actuators 3, 4, 5 to fully cover zones of the ports 7, 8, 9, so that fluid can be prevented from flowing through ports completely when the ports are closed.

When ports are in a closed state, actuators closely contact with a surface of the second layer around the ports (e.g. actuators 3, 4, 5 in FIG. 3, actuator 5 in FIG. 5 and actuator 3 in FIG. 6), and thus fluid can be impeded from flowing through ports. When an electric signal corresponding to an opened port is applied to an actuator, deformation will occur to the actuator (e.g., the centre of the actuator is raised), and thus, on two sides of the actuator that are not fixed, a gap may be formed between the actuator and a surface of the second layer surrounding the port, and fluid can flow through the gap. As can be easily seen in combination with FIGS. 3 to 6, fluid passes through from two sides that are not fixed, so as to open a corresponding fluid port (e.g., actuators 3 and 4 in FIG. 5 and actuators 4 and 5 in FIG. 6 are raised at their centers, so as to open corresponding ports). In addition, in accordance with size of an applied opening signal, the degree of deformation of an actuator (the degree to which it is lifted or raised) will differ, and therefore, gaps with different degrees (i.e. gaps of different sizes) may be formed between the actuator and a surface of the second layer surrounding a port. In turn, the fluid flowrate or flux through the port can be controlled precisely.

As for the above three ports 7, 8, 9, flow of fluid can be controlled in different combining manners of port on/off control. For example, when ports 7 and 8 are open and port 9 is closed (a first state), as illustrated in FIG. 5, fluid coming from a fluid source passes into the cavity 6 through the port 7, and flows toward a mechanism for control of a main valve (e.g., a spring-loaded piston means as a valve core of the main valve) through the port 8.

When ports 8 and 9 are open and port 7 is closed (a second state), as illustrated in FIG. 6, owing to the fact that the fluid pressure at the control port 8 is greater than the fluid pressure at the backflow port 9, fluid will flow along the direction denoted by arrows in FIG. 6.

The first state and the second state as stated above are typical modes to control the main valve in the embodiment. It is to be noted that, on/off states of three ports are independently controlled (which differs from the pilot microvalve stated in Description of the Related Art), and therefore, more control modes can be achieved by different combinations of control of individual ports. In addition, an open-loop control of opening degree of the main valve may also be realized by using the microvalve device.

For each mode, by regulating size of an electric signal applied to an actuator, a precise control of the degree to which each port is opened can be realized. On this basis, a linear control of the main valve can be obtained.

Modified Examples

The foregoing is merely a typical embodiment of the invention. In the present invention, each port is independently controlled with the aid of the above port control structure, and the opening degree of each port can be controlled precisely. Thus, various combining manners of control of individual ports and a linear control and an open-loop control of the main valve can be realized. However, the invention is not limited to the above specific embodiments. For example, three ports may be opened simultaneously to different degrees; in the case that the fluid source port is opened completely, the opening degrees of the control port and the backflow port are adjusted, so that the inflowing flux of fluid source can be distributed precisely.

In the above embodiments, an example in which there are three fluid ports in the second layer is given. However, it is to be noted, fluid ports in different numbers (such as, two or not less than four) may be designed on the second layer according to different requirements, and various different combining manners of port on/off may be adopted according to requirements upon control. In addition, each fluid port may be used for different purposes, and is not limited to the fluid source port, the control port and the backflow port as stated above. Further, the sectional shape of ports illustrated in figures is a circular shape, but the invention has no special restriction on the sectional shape of ports. For example, it may be a rectangular shape, a square shape, or a polygonal shape.

Additionally, a microvalve structure according to embodiments of the invention is exemplarily illustrated in figures of the invention, however, for the sake of clarity, it is not drawn according to an actual size scale. In actual applications, size of the microvalve device and size of each component may be arbitrarily adjusted according to actual requirements. For example, size of the microvalve is dependent on size of a fluid port, and size of the port is dependent on requirements on fluid flux control. For example, sizes of a port and a microvalve are usually controlled to be below 1 cm, that is, on the order of micrometer. In addition, other component(s) may also be added to the microvalve device according to embodiments of the invention according to requirements.

With respect to the microvalve structure as stated above, the first layer with concave shape and the second layer are bonded to form a cavity structure in the middle. However, it may also be possible that a concave structure is formed in a second layer, or a concave structure is formed in each of a first layer and a second layer, so that a cavity is formed between the first layer and the second layer when they are bonded. In addition, a first layer with concave shape and/or a second layer may be formed integrally, such as, an integral structure formed by etching a silicon material. However, a first layer and/or a second layer may also be formed by combining a plate layer and a layer that protrudes from the plate layer to encircle a concave structure.

In the above embodiment, the deformation that the center of an actuator is raised is used to control on/off state of a fluid port, however, the invention is not limited thereto. In embodiments of the invention, various kinds of deformation of actuators may be used to control on/off state of fluid ports. As long as there is a gap between an actuator and a surface of the second layer surrounding a port, a corresponding port can be opened; while as long as an actuator is rendered to closely contact with a surface of the second layer surrounding a port, a corresponding port can be closed.

Description has been given to the example in which two opposite ends of an actuator are fixed about a port in the above embodiment, however, the invention is not limited thereto. In an embodiment of the invention, the following way may also be adopted: one end of an actuator is fixed onto a surface of a second layer surrounding a port. In this case, by means of controlling the warping degree of a non-fixed end, on/off state and the opening degree of a corresponding port may be controlled.

Description has been given to the example in which the deformation of an actuator in a direction perpendicular to a surface of the second layer is used to adjust the size of a gap between the actuator and the surface of the second layer in the above embodiment, however, the mode to control on/off state of a fluid port in the invention is not limited to this, either. For example, an actuator may move in a direction parallel to a surface of the second layer, and thus at least a part of a corresponding port can be exposed to open the corresponding port. Or, as long as each fluid port is independently controlled by a corresponding actuator, embodiments of the invention may adopt any other mode to control the opening and closing of a port with an actuator as well.

The above embodiment is so described that a corresponding port is in a closed state in a normal status, while the port is opened upon application of an opening signal. However, the invention is not limited thereto, an embodiment of the invention may also be the case that some or all ports are in an open state in a normal status, while corresponding ports are closed upon application of a closing signal.

As for actuators of the invention, any actuator structure well-known in the art may be used for them. The invention has no special restriction on the concrete type and structure of actuators, as long as they can cover ports in the microvalve and can be deformed upon signal application to take control of on/off of the microvalve. In addition, actuators of the invention and the layer containing ports may be formed by micromechanical machining processes at one time, and they may be separately formed as well.

Second Embodiment

According to a second embodiment of the invention, there is provided a method of controlling the fluid flow with a microvalve device. The microvalve device includes a microvalve body, which is composed of multiple layers and includes a first layer and a second layer that is bonded with the first layer and has a plurality of fluid ports, with a cavity formed between the first layer and the second layer. According to the method of controlling fluid of the embodiment, a plurality of actuators are respectively adopted to independently control the opening and closing of the plurality of fluid ports.

With the control method according to the embodiment, different combining manners of on/off state of fluid ports, which correspond to different modes in which fluid flows between ports, can be realized.

With the method according to the embodiment, in each on/off combining manner of ports, the opening degree of each port may be controlled independently. Therefore, with the control method according to the embodiment, a quantitative, precise control in each flow mode can be realized.

With the method according to the embodiment, individual discrete actuators are controlled by electric signals, and then, corresponding ports are controlled.

In addition, the method of controlling fluid according to the above embodiment may be implemented with the microvalve device according to any of above embodiments of the invention. Thus, corresponding functions and effects can also be achieved, and details are omitted here.

Technical solutions of the invention have been described above in combination with embodiments, but the invention is not limited to the specific solutions of the above embodiments, and is intended to encompass technical solutions equivalent to them. Various modifications, replacements or combinations may be made on the above embodiments without departing from the spirit and scope of the invention.

The invention claimed is:

1. A microvalve device for controlling fluid flow, comprising:
   a microvalve body, the microvalve body being composed of multiple layers and including a first layer and a second layer that is bonded with the first layer and has a plurality of fluid ports;
   a cavity, disposed between the first layer and the second layer;
   a plurality of actuators, respectively disposed corresponding to each fluid port,
   wherein, opening and closing of the plurality of fluid ports are controlled by the plurality of actuators independently,
   wherein, the plurality of fluid ports comprises a fluid source port, a control port and a backflow port, and
   upon the fluid source port and the control port being open and the backflow port being closed, fluid flows from the fluid source port toward the control port; and upon the fluid source port being closed and the control port and the backflow port being open, fluid flows from the control port toward the backflow port.

2. The microvalve device according to claim 1, wherein, the plurality of fluid ports are disposed in a region corresponding to the cavity, and the plurality of fluid ports run through the second layer.

3. The microvalve device according to claim 1, wherein, each fluid port of the plurality of fluid ports is fully covered by one actuator, and upon the fluid port being in a closed state, the actuator closely contacts with a surface of the second layer surrounding the port, so as to block up the fluid flow through the fluid port.

4. The microvalve device according to claim 1, wherein, corresponding one or two ends of each of the actuators are fixed around corresponding ports.

5. The microvalve device according to claim 1, wherein, the actuators are configured to be deformed in response to application of opening signals, so that gaps for passing of fluid are formed between the actuators and a surface of the second layer surrounding corresponding ports, for opening of corresponding ports.

6. The microvalve device according to claim 1, wherein, the first layer is configured for leadout of electrodes connected to the actuators, so that signals are input to the actuators.

7. The microvalve device according to claim 1, wherein, the actuators are configured to be deformed in different degrees in response to size of the applied signals, so that gaps with different sizes are produced between lower surfaces of the actuators and a surface of the second layer surrounding the ports.

8. The microvalve device according to claim 1, wherein, the actuators comprise electro-thermal actuators and piezoelectric actuators.

9. The microvalve device according to claim 1, wherein, the actuators are metal-piezoelectric bilayer membrane actuators.

10. The microvalve device according to claim 1, wherein, the plurality of actuators and the second layer containing the plurality of fluid ports are formed at one time by micromechanical machining processes.

11. The microvalve device according to claim 1, wherein, the fluid source port is communicated with a fluid source, and the control port is communicated with a mechanism for control of a main valve.

12. A method of controlling fluid flow with a microvalve device, which comprises a microvalve body composed of multiple layers and including a first layer and a second layer that is bonded with the first layer and has a plurality of fluid ports, with a cavity formed between the first layer and the second layer, the method comprising:

respectively adopting a plurality of actuators to independently control opening and closing of the plurality of fluid ports, so as to realize different combining manners of on/off states of fluid ports in correspondence with different modes in which fluid flows between ports, wherein, the plurality of fluid ports comprises a fluid source port, a control port and a backflow port, and upon the fluid source port and the control port being open and the backflow port being closed, fluid flows from the fluid source port toward the control port; and upon the fluid source port being closed and the control port and the backflow port being open, fluid flows from the control port toward the backflow port.

13. The method according to claim 12, in each of the combining manners of on/off states of fluid ports, the opening degree of each port is controllable independently.

14. The method according to claim 12, wherein, corresponding ports are controlled by means of applying electric signals to the actuators.

* * * * *